United States Patent [19]
Yokouchi et al.

[11] Patent Number: 5,215,313
[45] Date of Patent: Jun. 1, 1993

[54] MAGNETIC FLUID SEALING DEVICE

[75] Inventors: Atsushi Yokouchi, Yokohama; Shigeki Matsunaga, Tokyo, both of Japan

[73] Assignee: NSK, Ltd., Tokyo, Japan

[21] Appl. No.: 780,687

[22] Filed: Oct. 21, 1991

[30] Foreign Application Priority Data

Oct. 24, 1990 [JP] Japan .................................. 2-284136

[51] Int. Cl.⁵ .......................... E21B 33/00; F16J 9/00
[52] U.S. Cl. ..................................... 277/80; 277/96.1; 277/133
[58] Field of Search ..................... 277/80, 96.1, 133

[56] References Cited

U.S. PATENT DOCUMENTS

| | | | |
|---|---|---|---|
| 3,818,074 | 6/1974 | Ahlbrecht et al. | 260/486 |
| 4,486,026 | 12/1984 | Furumura et al. | 277/80 |
| 4,786,658 | 11/1988 | Hashimodo et al. | 522/121 |

FOREIGN PATENT DOCUMENTS

| | | |
|---|---|---|
| 51-11084 | 1/1976 | Japan . |
| 51-23489 | 2/1976 | Japan . |
| 58-2746 | 2/1980 | Japan . |
| 60-48668 | 6/1982 | Japan . |
| 2-89878 | 3/1990 | Japan . |

OTHER PUBLICATIONS

Bosei Kanri (Rust Prevention and Control), 23, 11-22 (Jul., 1979).
U.S. patent application. Ser. No. 07/527,909, Yokouchi et al.
Kenjiro Meguro and Kunio Esumi: "Nureno Kiso to Oyo (Fundamental and Application of Wetting)" 108-109 & Reference 4, K.K. Realizesha (Dec. 20, 1989).
Junjiro Aoki: "Kappuringuzai-Saiteki Riyo Gijutsu (Coupling Agents-Optimal Application Technology)", 140-143, K. K. Kagaku Gijutsu Sogo Kenkyusho (Feb. 25, 1988).
Products Information: Fluoroalkylsilanes, Toshiba Silicone Co., Ltd. (Nov., 1985).

Primary Examiner—Bernard Pianalto
Attorney, Agent, or Firm—Pennie & Edmonds

[57] ABSTRACT

A magnetic fluid sealing device is provided for sealing a gap between a first member and a second member movable relative to each other. The device has a magnetic fluid and a magnet for retaining the magnetic fluid in the gap. A two-dimensionally bonded monomolecular layer is formed as an oil-repelling layer from a coupling agent on at least an intermediate surface area of at least one of the first and second members, which intermediate surface area is located between a fluid-deposited surface area and a fluid-free surface area.

13 Claims, 8 Drawing Sheets

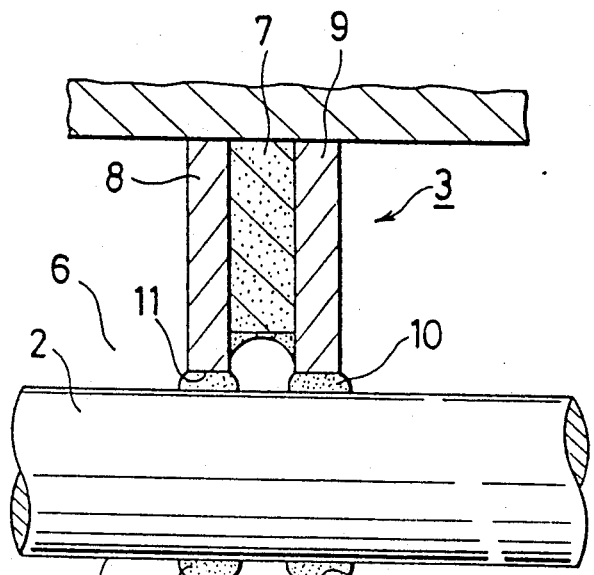
FIG. 18 PRIOR ART
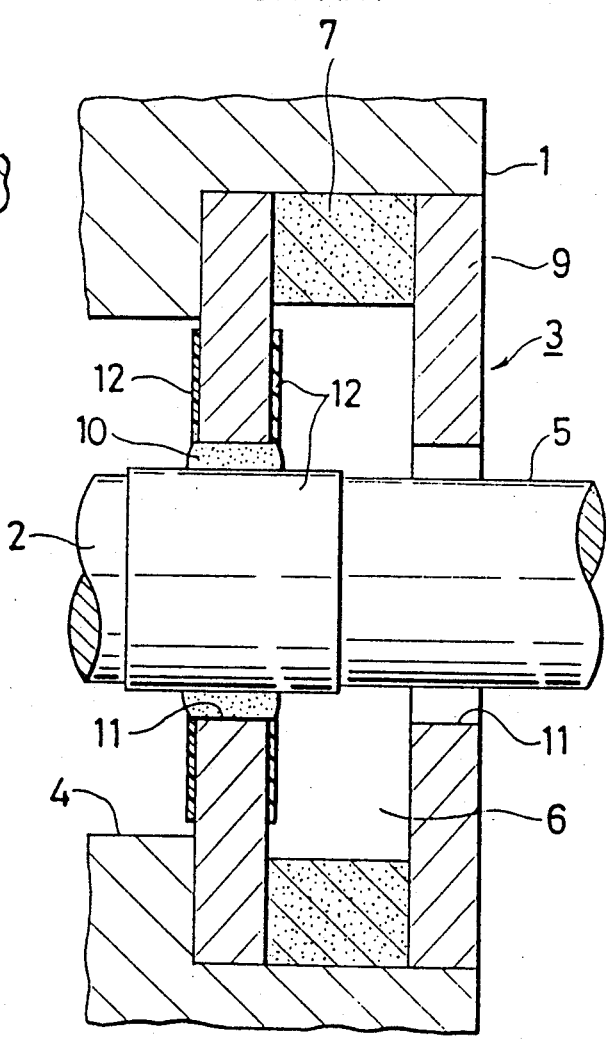
FIG. 19 PRIOR ART
FIG. 20
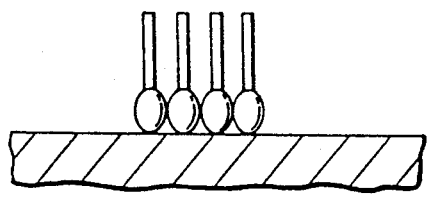
FIG. 21
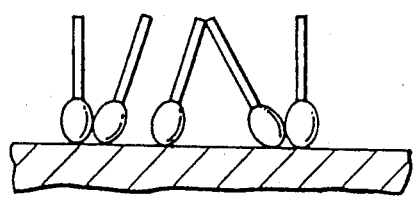

MAGNETIC FLUID SEALING DEVICE

BACKGROUND OF THE INVENTION

1) Field of the Invention

This invention relates to a magnetic fluid sealing device and its manufacturing process, and more specifically to a magnetic fluid sealing device suitable for use in ensuring the maintenance of airtight sealing, for example, at the position where a drive shaft for a hard disk assembled in a computer extends through a casing and also to its manufacturing process.

2) Description of the Related Art

A hard disk assembled in a computer or the like has a disk provided as a magnetic recording element inside a casing. This disk is driven by a motor provided outside the casing. Since the hard disk itself extremely disfavors fouling by dust and the like, a sealing device must be provided at the position where the drive shaft of the motor extends through the casing so that dust penetration can be prevented.

As sealing devices suitable for provision at such a position to prevent penetration of dust and the like, magnetic fluid sealing devices have been employed commonly, including those disclosed, for example, in Japanese Patent Application Laid-Open (Kokai) No. HEI 62-110080, Japanese Utility Model Application Laid-Open (Kokai) Nos. HEI 58-191423, HEI 61-13025, HEI 61-44067, HEI 61-79070, HEI 62-195261, HEI 61-204027, HEI 63-8419 and HEI 63-139325, Japanese Utility Model Publication (Kokoku) No. SHO 63-29944, and U.S. Pat. Nos. 4,628,384 and 4,692,826.

The magnetic fluid sealing devices disclosed in the above prior art publications basically have a structure similar to that illustrated in FIG. 18 although their structures are different in various ways in details.

In FIG. 18, numeral 1 indicates a housing made of a non-magnetic material such as aluminum or a synthetic resin. The housing 1 is secured, for example, on the casing described above. Designated at numeral 2 is a shaft made of a magnetic material such as iron. A main body 3 of a magnetic fluid sealing device is arranged within a cylindrical space defined between an inner circumferential wall 4 of the housing 1 and an outer circumferential wall 5 of the shaft 2.

In the main body 3 of the above magnetic fluid sealing device, an annular permanent magnet 7 magnetized in an axial direction, i.e., in the horizontal direction as viewed in FIG. 18 is held between a pair of pole pieces 8,9 formed in an annular shape with a magnetic material. A magnetic fluid 10 is retained by the magnetic force of the permanent magnet 7 in gaps 11,11 formed between inner circumferential edges of the pole pieces 8,9 and the outer circumferential wall 5 of the shaft 2, respectively. The permanent magnet 7 and the paired pole pieces 8,9 have an outer diameter either equal to or slightly greater than the inner diameter of the housing 1, whereby the main body 3 of the magnetic fluid sealing device, said main body being constructed of the members 7,8,9,10, is fitted in and fixed on the inner circumferential wall of the housing 1.

The main body 3 of the magnetic fluid sealing device is constructed between the inner circumferential wall 4 of the housing 1 and the inner circumferential wall 5 of the shaft 2 as described above, the sealing between the inner circumferential wall 4 of the housing 1 and the outer circumferential wall 5 of the shaft 2 can be maintained by the magnetic fluid 10 held between the outer circumferential wall 5 of the shaft 2 and the inner circumferential edges of the respective pole pieces 8,9 despite rotation of the shaft 2 inside the housing 1.

Incidentally, it is not absolutely necessary to use the pole pieces 8,9 in combination. A magnetic fluid sealing device can be constructed with a single pole piece provided that a magnetic field can be formed by a bearing or the like provided in the vicinity of the main body 3 of the magnetic fluid sealing device.

In a magnetic fluid sealing device constructed and used as described above, the magnetic fluid 10 formed by dispersing fine particles of a ferromagnetic material in an oil having extremely low volatility such as a hydrocarbon mineral oil, synthetic oil, ester oil, ether oil or silicone oil tends to spread over a wide area on the surface of the metal-made shaft 2 because of the strong wettability of the fluid for the surface of the shaft 2.

If the magnetic fluid 10 spreads over a wide area on the surface of the shaft 2 as described above, the surface area of the magnetic fluid 10 becomes greater. As a result, the evaporation loss of the dispersant oil increases (in a long period even if the oil has low volatility) and the service life of the magnetic fluid sealing device is therefore shortened due to the decreased amount of the magnetic fluid 10.

If the magnetic fluid 10 spreads along the surface of the shaft (or along the side walls of the pole pieces 8,9 and the inner circumferential wall of the housing 1 in the case of a different structure), the risk that the magnetic fluid 10 may scatter in a clean space with a hard disk provided therein becomes higher.

If the magnetic fluid 10 scatters in the clean space and sticks on the hard disk or the like accommodated inside the clean space, the magnetic fluid 10 may become a cause for a malfunction of a computer in which the hard disk or the like is assembled.

As a technique for the elimination of such an inconvenience, Japanese Patent Publication (Kokoku) No. SHO 60-48668 proposes, as shown in FIG. 19, to form oil-repelling films 12,12 of polytetrafluoroethylene (PTFE) in the vicinity of a gap 11 in which the magnetic fluid 10 is retained, so that the magnetic fluid 10 is prevented from spreading out of the gap 11.

The above patent publication, however, discloses nothing more than the formation of such oil-repelling films. It has therefore been difficult to construct a magnetic fluid sealing device having sufficient practical utility.

To provide at a low cost a magnetic fluid sealing device having good performance, high durability and high reliability, it is necessary to make it possible to efficiently form a film having good peeling resistance and oil-repelling property while making its thickness as thin as possible. None of these conditions, however, can be fully satisfied by the formation of the oil-repelling films 12,12 with PTFE or the like as disclosed in the above patent publication.

When the oil-repelling films 12,12 made of PTFE are formed, for example, as disclosed in the above patent publication, an additional cost is required for the formation of the films and, moreover, the oil-repelling films 12,12 so formed have a large thickness. The dimension of the gap 11 in which the magnetic fluid 10 is retained tends to vary, leading to the potential problem that the magnetic fluid 10 cannot be retained in a desired amount. If the oil-repelling films 12,12 made of PTFE are peeled off, relatively large dust may float in a clean space in which a hard disk or the like is accommodated and may also become a cause for a malfunction of a computer with the hard disk or the like assembled therein.

If the film surface is rough or contains scratches or the like, the magnetic fluid tends to spread along recesses or scratches. Spreading of the magnetic fluid tends to contaminate the clean space due to the scattered magnetic fluid.

With a view to overcoming such an inconvenience, the present inventors have already invented magnetic fluid sealing devices in each of which an oil-repelling layer in the form of an adsorbed monomolecular layer is formed on an intermediate surface area between a fluid-deposited surface area and a fluid-free surface area by causing a fluorinated surfactant to be adsorbed on the intermediate surface area (copending U.S. patent application Ser. No. 07/527,909 filed May 25, 1990). In the magnetic fluid sealing devices according to such previous inventions, an extremely-thin oil-repelling layer having extremely high peeling resistance can be formed. Under severe use conditions, there are however still accompanied by such unsolved problems as will be described next.

Preferably, molecules of a fluorinated surfactant forming an adsorbed monomolecular layer should be arranged in good order without intervals on the intermediate surface area as depicted in FIG. 20. Molecules of the fluorinated surfactant are however adsorbed at random on the surface area as shown in FIG. 21 because they do not have two-dimensional bonding force, i.e., bonding force in the direction of a plane in which the monomolecular layer lies.

Nevertheless, the adsorbed monomolecular layer has sufficient practical utility as long as it is used under normal use conditions. Under severe use conditions, it may however be found insufficient in durability, weatherability and the like.

SUMMARY OF THE INVENTION

An object of the present invention is therefore to provide a magnetic fluid sealing device and its manufacturing process, which have reduced or eliminated the inconvenience described above.

In one aspect of the present invention, there is thus provided a magnetic fluid sealing device for sealing a gap between a first member and a second member movable relative to each other. The device includes a magnetic fluid and a magnetic means for retaining the magnetic fluid in the gap, the device comprises:

a two-dimensionally bonded monomolecular layer formed as an oil-repelling layer from a coupling agent on at least an intermediate surface area of at least one of the first and second members, said intermediate surface area being located between a fluid-deposited surface area of said at least one member and a fluid-free surface area free of said at least one member.

In another aspect of the present invention, there is also provided a magnetic fluid sealing device comprising:

a shaft made of a magnetic material and having a cylindrical outer circumferential wall, a housing rotatable relative to the shaft, a permanent magnet formed in an annular shape of a size that permits the permanent magnet to be freely inserted into a cylindrical space between an inner circumferential wall of the housing and the outer circumferential wall of the shaft, said permanent magnet having been magnetized in an axial direction thereof, at least one pole piece formed in an annular shape having an inner diameter greater than the outer diameter of the shaft, said pole piece being secured on a side wall of the permanent magnet and fitted in place within the inner circumferential wall of the housing, a magnetic fluid retained between the inner circumferential edge of the pole piece and the outer circumferential wall of the shaft by the magnetic force of the permanent magnet, a first fluid-deposited surface area which is a part of the outer circumferential wall of the shaft with the magnetic fluid deposited thereon, a first fluid-free surface area which is another part of the outer circumferential wall of the shaft, said another part being located in a clean space defined inwardly of the housing than the first fluid-deposited surface area, a second fluid-deposited surface area which is the surface of the inner circumferential edge of the pole piece, and a second fluid-free surface area which is a part of a side wall of the pole piece, said side wall facing the clean space. A two-dimensionally bonded monomolecular layer is formed as an oil-repelling layer from a coupling agent on at least one of a first intermediate surface area on the outer circumferential wall of the shaft and a second intermediate surface area on the side wall of the pole piece. The first intermediate surface area is located between the first fluid-deposited surface area and the first fluid-free surface area, and the second intermediate surface area between the second fluid-deposited surface area and the second fluid-free surface area.

In a further aspect of the present invention, there is also provided a magnetic fluid sealing device comprising:

at least one pole piece having a circular outer circumferential edge, a housing having a cylindrical inner circumferential wall greater in diameter than the outer circumferential edge of the pole piece, said housing being made of a magnetic material and being rotatable relative to the pole piece, a permanent magnet shaped and sized to permit the permanent magnet to be freely inserted into the housing, said permanent magnet having been magnetized in an axial direction thereof and being secured on a side wall of the pole piece, a magnetic fluid retained between the outer circumferential edge of the pole piece and the inner circumferential wall of the housing by the magnetic force of the permanent magnet, a first fluid-deposited surface area which is a part of the inner circumferential wall of the housing with the magnetic fluid deposited thereon, a first fluid-free surface area which is another part of the inner circumferential wall of the housing, said another part being located in a clean space defined inwardly of the housing than the first fluid-deposited surface area, a second fluid-deposited surface area which is the surface of the outer circumferential edge of the pole piece, and a second fluid-free surface area which is a part of a side wall of the pole piece, said side wall facing the clean space. A two-dimensionally bonded monomolecular layer is formed as an oil-repelling layer from a coupling agent on at least one of a first intermediate surface area on the inner circumferential wall of the housing and a second intermediate surface area on the side wall of the pole piece. The first intermediate surface area is located between the first fluid-deposited surface area and the first fluid-free surface area, and the second intermediate surface area between the second fluid-deposited surface area and the second fluid-free surface area.

In a still further aspect of the present invention, there is also provided a process for the manufacture of each of the above magnetic fluid sealing devices, which comprises:

dissolving the coupling agent in a solvent selected from the group consisting of water, alcohols, acetone, methyl ethyl ketone, chlorinated solvents, flon solvents, and fluorinated solvents having a fluoro or perfluoro chain and mixtures thereof, thereby forming a solution of the coupling agent, applying the solution to said intermediate surface area or said at least one intermediate surface area to have the coupling agent adsorbed in a desired amount on said at least one intermediate surface area, and subjecting the coupling agent to dehydration condensation to form the two-dimensionally bonded monomolecular layer.

Owing to the provision of the two-dimensionally bonded monomolecular layer as an oil-repelling layer on the intermediate surface area, the magnetic fluid is prevented from spreading onto the fluid-free surface area. The monomolecular layer has high peeling resistance as it is bonded two-dimensionally. It is therefore possible to keep clean a clean space defined inside the magnetic fluid sealing device and accommodating one or more elements which disfavor the deposition of dust, such as a hard disk. The manufacturing process allows to provide the oil-repelling layer in an extremely thin and highly peeling resistant form in a short time by a simple operation. It is therefore possible to economically provide magnetic fluid sealing devices having good performance and high durability and reliability.

Further, each oil-repelling layer so formed is extremely thin so that the air cleanliness of the associated clean space is not impaired and the dimension of the gap in which the magnetic fluid is to be retained is not changed.

BRIEF DESCRIPTION OF THE DRAWINGS

The above and other objects, features and advantages of the present invention will become apparent from the following description and the appended claims, taken in conjunction with the accompanying drawings, in which:

FIGS. 6-7 show a laboratory stand used in an experiment conducted to confirm advantageous effects of the present invention, in which FIG. 6 is a side vie of the stand and FIG. 7 is a view seen in the direction of arrow A in FIG. 6;

FIG. 18 is a cross-sectional view showing the basic structure of a conventional magnetic fluid sealing device;

FIG. 19 is a fragmentary cross-sectional view showing another conventional magnetic fluid sealing device;

FIG. 20 schematically shows a monomolecular layer having good orientation; and

FIG. 21 schematically illustrates a monomolecular layer having poor orientation.

DETAILED DESCRIPTION OF THE INVENTION AND PREFERRED EMBODIMENTS

Figure 1:
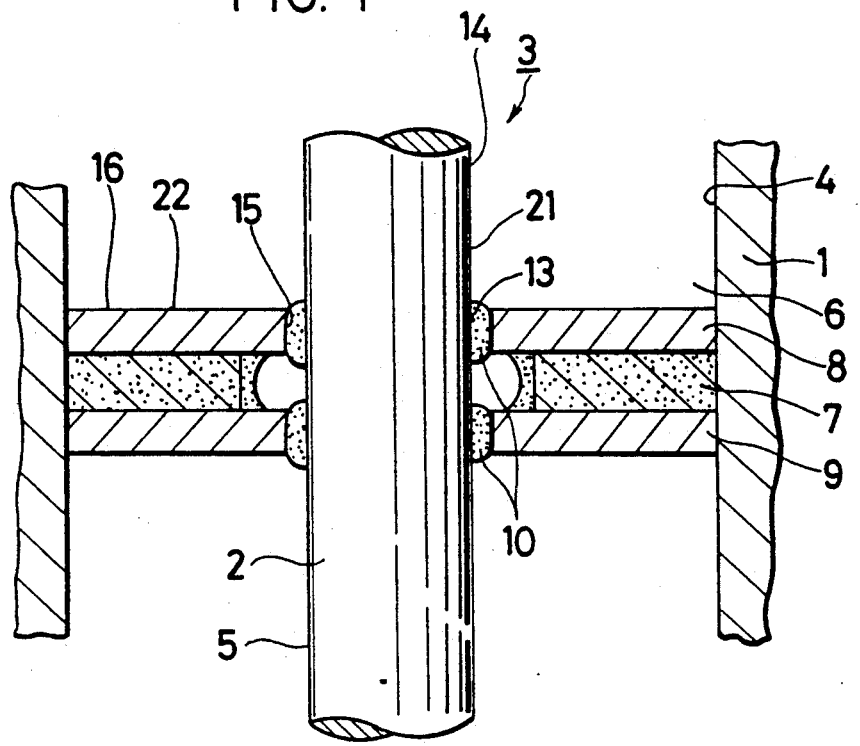
FIG. 1 is a cross-sectional view of a magnetic fluid sealing device according to a first embodiment of the present invention.
Figure 2:
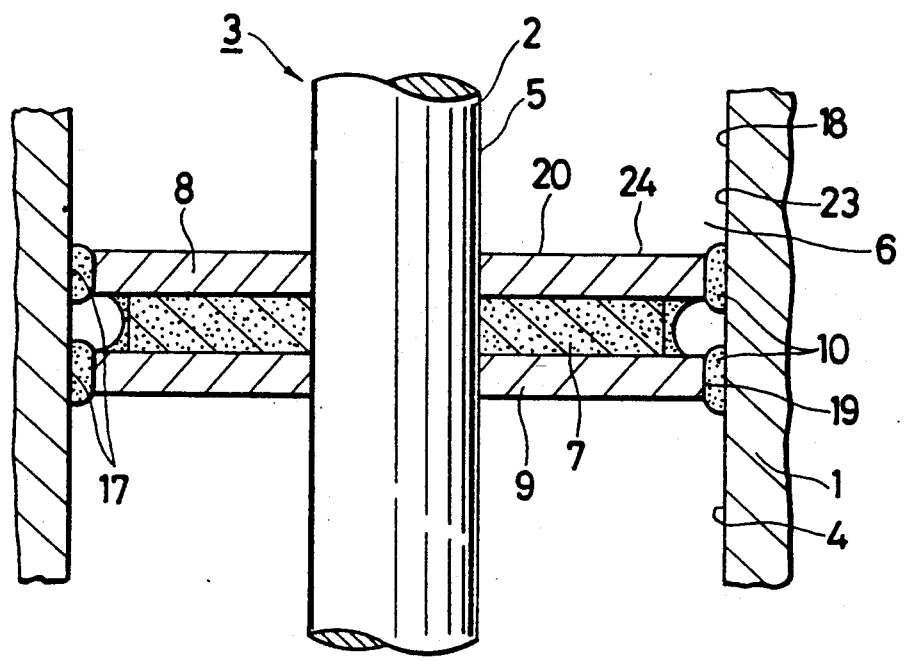
FIG. 2 is a cross-sectional view of a magnetic fluid sealing device according to a second embodiment of the present invention.

As shown in FIG. 1 or FIG. 2, each magnetic fluid sealing device according to the present invention is constructed of a shaft 2 having a cylindrical outer circumferential wall 5 (in the structure of FIG. 2, the cross-section of the shaft 2 is not absolutely required to have a circular shape); a housing 1 having a cylindrical inner circumferential wall 4 concentric with the outer circumferential wall 5 of the shaft 2 (where the magnetic fluid sealing device has the structure of FIG. 1 and the shaft 2 rotates, the inner circumferential wall 4 is not required to be concentric with the shaft 2 and cylindrical), said housing 1 being rotatable relative to the shaft 2; a permanent magnet 7 formed in an annular shape of a size that permits the permanent magnet to be freely inserted into a cylindrical space 6 between the inner circumferential wall 4 of the housing 1 and the outer circumferential wall 5 of the shaft 2, said permanent magnet having been magnetized in an axial direction thereof; at least one of pole pieces 8,9 (two pole pieces in the illustrated embodiments) formed in an annular shape and holding the permanent magnet 7 therebetween (neither the permanent magnet 7 not the pole pieces 8,9 are absolutely required to have an annular shape if the inner circumferential edges of the pole pieces 8,9 are circular in the case of the structure of FIG. 1 or if the outer circumferential edges of the pole pieces 8,9 are circular in the case of the structure of FIG. 2); and a magnetic fluid 10 retained by the magnetic force of the permanent magnet 7 between the inner circumferential edges of the pole pieces 8,9 and the outer circumferential wall 5 of the shaft 2 or between the outer circumferential edges of the pole pieces 8,9 and the inner circumferential wall 4 of the housing. Of the inner circumferential wall 4 of the housing 1 and the outer circumferential wall 5 of the shaft 2, at least each surface area on which the magnetic fluid 10 is deposited is formed of a magnetic material.

In the case of the structure that the permanent magnet 7 and the pole pieces 8,9 are secured on the inner circumferential wall 4 of the housing 1 as illustrated in FIG. 1, a part of the outer circumferential wall 5 of the shaft 2, on which part the magnetic fluid 10 is deposited, is designated as a first fluid-deposited surface area 13; another part of the outer circumferential wall 5 of the shaft 2, said another part being located in a clean space (located in an upper part of FIG. 2) defined inwardly of the housing 1 than the first fluid-deposited surface area 13, is designated as a first fluid-free surface area 14; the surface of the inner circumferential edge of the pole piece 8 facing the clean space is designated as a second fluid-deposited surface area 15; and a part of a side wall of the pole piece 8, said side wall facing the clean space, is designated as a second fluid-free surface area 16.

In the case of the structure that the permanent magnet 7 and the pole pieces 8,9 are secured on the outer circumferential wall 5 of the shaft 2 as illustrated in FIG. 2, a part of the inner circumferential wall 4 of the housing 1, on which part the magnetic fluid 10 is deposited, is designated as a first fluid-deposited surface area 17; another part of the inner circumferential wall 4 of the housing 1, said another part being located in a clean space defined inwardly of the housing 1 than the first fluid-deposited surface area 17, is designated as a first fluid-free surface area 18; the surface of the outer circumferential edge of the pole piece 8 is designated as a second fluid-deposited surface area 19; and a part of a side wall of the pole piece 8, said side wall facing the clean space, is designated as a second fluid-free surface area 20.

The first and second fluid-deposited surface areas 13,15,17,19 are each deposited with the magnetic fluid 10 so as to seal the gap between the inner circumferential wall 4 of the housing 1 and the outer circumferential wall 5 of the shaft 2. In contrast, the first and second fluid-free surface areas 14,16,18,20 are each facing the clean space in which a hard disk or the like is accommodated, so that their disfavor deposition of the magnetic fluid 10.

The structures described above are similar to those of magnetic fluid sealing devices known to date. In the magnetic fluid sealing devices according to the present invention, an oil-repelling layer (low energy surface layer) characteristic of the present invention is formed between the fluid-deposited surface areas 13,15,17,19 and their corresponding fluid-free surface areas 14,16,18,20 to prevent the magnetic fluid 10 from flowing from the fluid-deposited surface areas 13,15, 17,19 to the fluid-free surface areas 14,16,18,20.

In the embodiment illustrated in FIG. 1, a coupling agent, preferably a silane coupling agent is applied to a first intermediate surface area 21 located on the outer circumferential wall 5 of the shaft 2 at a position between the first fluid-deposited surface area 13 and the first fluid-free surface area 14 and also to a second intermediate surface area 22 located on the side wall of the pole piece 18 at a position between the second fluid-deposited surface area 15 and the second fluid-free surface area 16, whereby oil-repelling layers are formed on the first and second intermediate surface areas 21,22, respectively. It is, however, not essential to form the oil-repelling layer on each of the intermediate surface areas 21,22. It may be sufficient to form the oil-repelling layer on at least one of the first and second intermediate surface areas 21,22.

In the embodiment shown in FIG. 2, a coupling agent, preferably a silane coupling agent is applied to a first intermediate surface area 23 located on the inner circumferential wall 4 of the housing 1 at a position between the first fluid-deposited surface area 17 and the first fluid-free surface area 18 and also to a second intermediate surface area 24 located on the side wall of the pole piece 8 at a position between the second fluid-deposited surface area 19 and the second fluid-free surface area 20, whereby oil repelling layers are formed on the first and second intermediate surface areas 23,24, respectively. It is, however, not essential to form the oil-repelling layer on each of the intermediate surface areas 23,24. It may be sufficient to form the oil-repelling layer on at least one of the first and second intermediate surface areas 23,24.

In both the embodiments, it is preferable to form an oil-repelling layers on each of the intermediate surface areas (i.e., the intermediate surface areas 21,22 in the embodiment shown in FIG. 1 and the intermediate surface areas 23,24 in the embodiment depicted in FIG. 2) so that spreading of the magnetic fluid 10 can be prevented. It may however be unnecessary to form an oil-repelling layer at a surface area where spreading of the magnetic fluid 10 is prevented owing to centrifugal force produced as a result of rotation of the housing 1 or the shaft 2. Further, no problem or inconvenience arises even when an oil-repelling layer is also formed on the respective fluid-deposited surface areas 13,15,17,19 and the respective fluid-free surface areas 14,16,18,20.

In the process of this invention for the manufacture of such a magnetic fluid sealing device, water, alcohols, acetone, methyl ethyl ketone, chlorinated solvents, flon solvents, and fluorinated solvents having a fluoroalkyl or perfluoroalkyl chain and mixtures thereof are used either singly or in combination as a solvent for applying the coupling in a desired amount to a desired surface area.

By the magnetic fluid sealing device of this invention constructed as described above, the gap between the inner circumferential wall 4 of the housing and the outer circumferential wall 5 of the shaft 2 can be sealed while permitting free relative rotation between the housing 1 and the shaft 2. In this respect, the magnetic fluid sealing device of this invention is similar to magnetic fluid sealing devices known to date.

In the magnetic fluid sealing device of this invention, the magnetic fluid 10 retained at the inner or outer circumferential edge of the pole piece 8 is prevented from spreading into the associated clean space owing to the oil-repelling layer formed on at least one of the first and second intermediate surface areas 21,22,23,24. This effect itself is similar to that available from the invention disclosed in Japanese Patent Publication (Kokoku) No. SHO 60-48668 referred to above.

Each oil-repelling layer, however, is formed from a coupling agent in the magnetic fluid sealing device according to this invention. It is therefore possible to easily form an oil-repelling layer which is extremely thin and moreover has extremely high peeling resistance. Further, the dimensions of the gap in which the magnetic fluid is to be retained are not substantially varied by the formation of the oil-repelling layer. It is hence possible to economically provide magnetic fluid sealing devices having good performance and high durability and reliability.

Among molecules of a coupling agent used to form an oil-repelling layer, only molecules closest to a surface of a metal-made component are strongly attached to the surface because hydrolyzable groups present at proximal ends of the latter molecules chemically bond to the surface of the component. As a result, an extremely thin, monomolecular oil-repelling layer is formed on the surface and, moreover, the adjacent molecules are two-dimensionally bonded together (i.e., as a two-dimensionally bonded monomolecular layer), thereby providing an oil-repelling layer having extremely high peeling resistance. Even if the two-dimensionally bonded monomolecular layer forming the oil-repelling layer is peeled off and is caused to drift in an associated clean space, the pieces so peeled off are extremely small (not greater than 1 nm). Since the sizes of these peeled-off pieces are much smaller than the particles referred to in the definition for with Cleanliness Class 10 (not more than 10 particles per cubic inches, said particles being 0.5 μm or greater) required for the clean space, they do not have such a potential danger as causing malfunction of a hard disk or the like accommodated within the clean space.

Described more specifically, the coupling agent contains one or more hydrolyzable groups (HO—, CH₃O—, C₂H₅O—, CH₃OC₂H₄O—, Cl—) in its molecular structure and can chemically bond with metals. Examples of coupling agents include silane coupling agents, titanium-containing coupling agents, aluminum-containing coupling agents, and zircoaluminate coupling agents. Among these, coupling agents suited for the present invention are those containing an alkyl chain, a fluoroalkyl chain or a perfluoroalkyl chain. In particular, non-reactive silane coupling agents represented by the following structural formula are suitable.

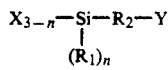

wherein X means a hydrolyzable group such as a chloro, alkoxy, acetoxy or isopropenoxy group, Y denotes a perfluoroalkyl or fluoroalkyl chain, $R_1$ represents an ethyl ($CH_3$—$CH_2$—) or methyl ($CH_3$—) group, $R_2$ is a methylene group represented by —$(CH_2)_m$—, m being a natural number, preferably 1-6, more preferably 2 or 3, and n stands for an integer of 0, 1 or 2.

These non-reactive silane coupling agents are hydrolyzed, for example, with water in their non-aqueous solutions or aqueous solutions or in air or with water adsorbed on metal surfaces (an oxide film is generally formed on a surface of a member, said surface being exposed to air, and water is adsorbed on the surface of the oxide film), whereby highly reactive silanol (Si—OH) groups are formed. These silanol groups are adsorbed on the surface of the member and are then caused to undergo dehydration condensation to form covalent bonds.

Figure 3:
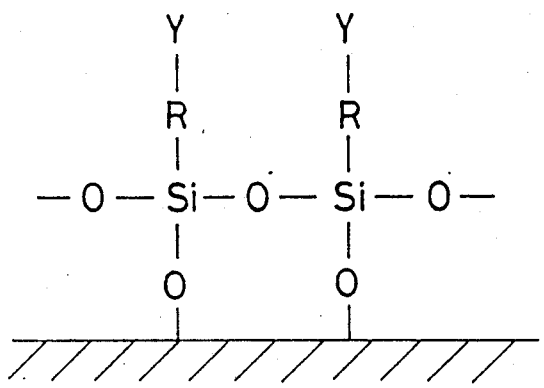
FIG. 3 schematically shows the basic concept of a two-dimensionally bonded monomolecular layer formed on a surface of a member in accordance with the present invention.

Among the non-reactive silane coupling agents described above, those represented by the structural formula $X_3$—Si—$R_2$—Y can form three silanol groups per molecule, so that one of the silanol groups bonds to the surface of the member and the remaining two silanol groups are chemically bonded with the adjacent molecules. As a result, molecules of the silane coupling agent are bonded two-dimensionally on the surface of the member so that a siloxane oligomer is formed. The individual molecules are therefore lowered in freedom, thereby forming a two-dimensionally bonded film in which perfluoroalkyl or fluoroalkyl chains (Y) are oriented very well. The two-dimensionally bonded film so formed contains covalent bonds because, as illustrated in FIG. 3, silanol groups undergo dehydration condensation with hydroxyl groups on the surface of the member or other silanol groups. Since the two-dimensionally bonded layer is an extremely thin monomolecular layer, it neither affects the dimensions and accuracy of the sealing device nor becomes a dust source.

Illustrative specific silane coupling agents include:
$CF_3(CH_2)_2Si(OCH_3)_3$
$CF_3(CF_2)_3(CH_2)_2Si(OCH_3)_3$
$CF_3(CF_2)_7(CH_2)_2Si(OCH_3)_3$
$CF_3(CF_2)_7(CH_2)_2(CH_3)Si(OCH_3)_2$
$CF_3(CF_2)_6COO(CH_2)_3Si(OCH_3)_3$
$CF_3(CF_2)_6COS(CH_2)_3Si(OCH_3)_3$
$CF_3(CF_2)_6CONH(CH_2)_3Si(OC_2H_5)_3$
$CF_3(CF_2)_7SO_2NH(CH_2)_3Si(OC_2H_5)_3$
$CF_3(CF_2)_7(CH_2)_2S(CH_2)_2Si(OCH_3)_3$
$CF_3(CF_2)_9(CH_2)_2S(CH_2)_2Si(OCH_3)_3$
$CF_3(CH_2)_2SiCl_3$
$CF_3(CF_2)_5(CH_2)_2SiCl_3$
$CF_3(CF_2)_5(CH_2)_2Si(OCH_3)_3$
$CF_3(CF_2)_7(CH_2)_2SiCl_3$
$CF_3(CF_2)_7(CH_2)_2(CH_3)SiCl_2$ The mechanism in which the silane coupling agent forms the two-dimensionally bonded layer on the surface of the member can be summarized as will be described next. Firstly, hydrolyzable groups of the silane coupling agent are hydrolyzed to form silanol groups. Silanol groups of adjacent molecules undergo dehydration condensation to form an oligomer and, at the same time, other silanol groups of the molecules are chemically adsorbed by a hydrogen bond on the surface of the member. The molecules of the silane coupling agent so adsorbed on the surface of the member have already formed covalent bonds as a result of the dehydration condensation, so that the layer so formed is a two-dimensionally bonded monomolecular layer. As the adjacent molecules have covalently bonded together two-dimensionally into an oligomer or a polymer, the resultant layer has high strength. In the layer so formed on the surface of the member, fluoroalkyl or perfluoroalkyl chains are well oriented so that the surface energy reducing ability of the chains is maximized. As a result, it is possible to allow the two-dimensionally bonded monomolecular layer to exhibit its ability to prevent spreading of a magnetic fluid to the maximum.

Figure 4:
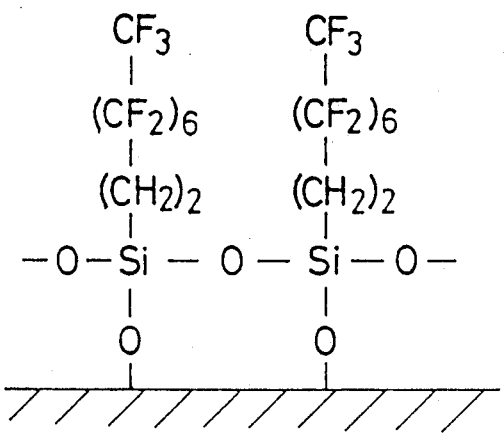
FIG. 4 schematically illustrates a two-dimensionally bonded monomolecular layer of molecules having no polar group.
Figure 5:
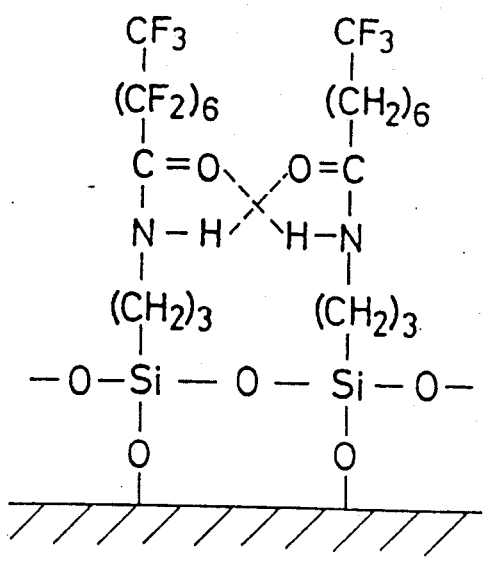
FIG. 5 schematically depicts a two-dimensionally bonded monomolecular layer of molecules having polar groups.

The orientation can be improved further when each molecule contains one or more polar structure at sites remote from the hydrolyzable group. If a polar structure is not contained at any part of each molecule, the adjacent molecules are bonded at only the silanol groups thereof as shown in FIG. 4 so that the orientation of the —R—Y chains in the above-described structural formula is not very good. If one or more polar groups such as amido or sulfonamido groups are contained at some sites of each molecule, interaction such as hydrogen bond takes place between adjacent molecules as shown in FIG. 5 whereby the orientation of the —R—Y chains can be improved. Illustrative coupling agents which can improve the orientation still further, include $CF_3(CH_2)_7SO_2NH(CH_2)_3Si(OC_2H_5)_3$ and the like.

A first process for forming such a two-dimensionally bonded monomolecular layer of a coupling agent on a surface of a metallic member comprises spray-coating the surface of the metallic member with the coupling agent in a liquid form and heating the coupling agent. If necessary, any extra coupling agent may be removed with a solvent prior to the heating. The heating is conducted to shorten the reaction time. The heating is therefore not essential if a longer reaction time is acceptable.

A second process comprises dipping a member, which is to be surface-treated, in a solution of a coupling agent in a solvent and, after drying the thus dip-coated member in air, heating the coupling agent. If necessary, any extra coupling agent may also be removed with a solvent after the air drying. When the solvent is used as described above, the solvent may be any solvent as long as it can dissolve the coupling agent. Usable solvents include, for example, water, alcohols, acetone, methyl ethyl ketone, chlorinated solvents, flon solvents, and fluorinated solvents having a fluoroalkyl or perfluoroalkyl chain, and mixtures thereof. To shorten the hydrolyzing time, an aqueous acetic acid solution, aqueous ammonia or the like can be added to water, an alcohol, acetone, methyl ethyl ketone or a mixture thereof to adjust the pH of the resulting solution. The solution may be heated if necessary. The coupling agent may be added to the solvent at any desired concentration as long as the resulting solution contains the coupling agent in an amount sufficient to form a two-dimensionally bonded monomolecular layer on the surface of the member. The concentration of the coupling agent, however, is desirably 0.1 wt. % or higher. No particular limitation is imposed on its upper limit.

A description will next be made of experiments which were conducted to ascertain advantageous effects of the present invention.

In each experiment, an oil-repelling layer was formed on a surface of a circular stainless steel plate 25 made of the same material as the pole piece 8 (see FIGS. 6–7 to be described later). A magnetic fluid 10 of the same composition as that employed in commercial magnetic fluid sealing devices was dropped on the surface of the stainless steel plate 25, and the manner of movement of the magnetic fluid 10 was observed.

In each of the experiments other than an experiment in which no surface treatment was applied, the above-described stainless steel plate 25 was subjected to surface treatment (i.e., treatment for the formation of an oil-repelling layer) through the following first to fifth steps (a)–(e):

(a) First step

The stainless steel plate 25, the surface of which had been degreased, was dipped for 30 minutes in a 0.5 wt./v.% solution of a silane coupling agent in isopropanol as a solvent while controlling the temperature of the solution at 80° C. The stainless steel plate 25 was then taken out of the solution.

(b) Second step

The stainless steel plate 25 taken out of the solution was dipped for 20 seconds in ethanol (or Freon) at room temperature.

(c) Third step

The stainless steel plate 25 which had been taken out of ethanol was dried under evacuation over 24 hours while heating it at 100° C. (vacuum drying).

(d) Fourth step

The stainless steel plate 25 so dried was dipped for 20 seconds in ethanol which was maintained under ultrasonic vibrations, whereby any extra coupling agent deposited on the surface of the stainless steel plate 25 was removed. The stainless steel plate 25 was then taken out of ethanol.

(e) Fifth step

The stainless steel plate 25 taken out of ethanol was dried.

Figure 6:
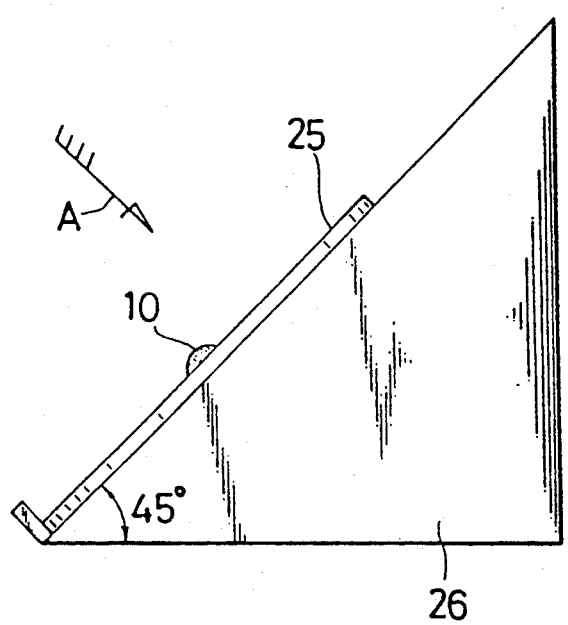
Figure 7:
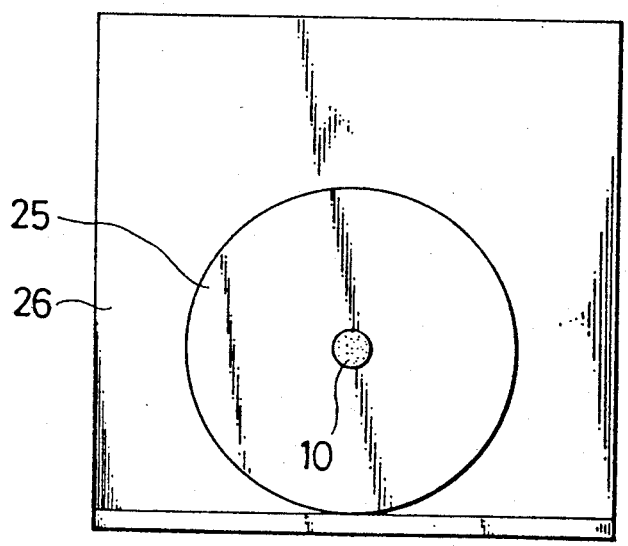

After 1 μl of the magnetic fluid 10 was dropped centrally on the upper surface of the stainless steel plate 25 surface-treated by the above-described series of steps, the stainless steel plate 25 was immediately placed on a stand 26 illustrated in FIGS. 6–7. Upon elapsed time of 5 minutes, any configurational change of the magnetic fluid 10 was visually observed.

Incidentally, the upper surface of the stand 26 is tilted at 45 degrees. When the stainless steel plate 25 with the magnetic fluid 10 centrally dropped on the upper surface thereof was placed, the magnetic fluid 10 was subjected to force which would cause the magnetic fluid 10 to flow downwardly under the gravity.

Figure 8:
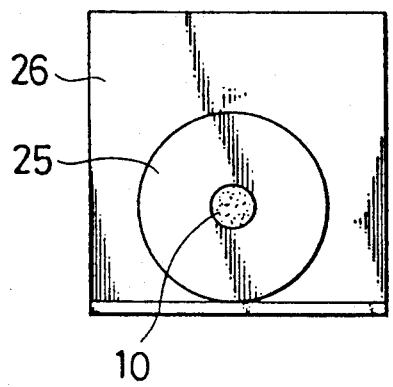
FIGS. 8, 9 and 10 are similar to FIG. 7 but illustrate three typical states of a magnetic fluid in experiments.
Figure 9:
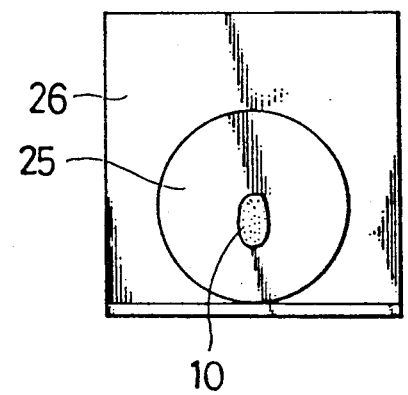
Figure 10:
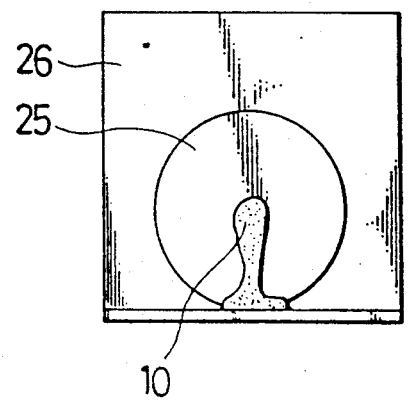

As a result of the visual observation of any configurational change of the magnetic fluid 10 upon the elapsed time of 5 minutes as described above, cases in which the shape of the magnetic fluid 10 did not change as shown in FIG. 8 were rated as "excellent", cases in which the shape of the magnetic fluid 10 changed but did not reach the lower edge of the stainless steel plate 25 as depicted in FIG. 9 were rated as "good", and cases in which the shape of the magnetic fluid 10 changed and reached the lower edge of the stainless steel plate 25 as illustrated in FIG. 10 were rated as "poor".

The target of the present invention is to obtain at least the "good" state, more preferably the "excellent" state under the rating system described above.

EXPERIMENT 1

An experiment was conducted under the above-described conditions by using β-perfluorooctylethyltrimethoxysilane [$CF_3(CF_2)_7CH_2CH_2Si(OCH_3)_3$], a silane coupling agent. The shape of the magnetic fluid 10 dropped centrally on the upper surface of the stainless steel plate 25 did not change as shown in FIG. 8 even after an elapsed time of 5 minutes. "Excellent" oil-repelling property was confirmed.

EXPERIMENT 2

An experiment was conducted under the above-described conditions by using 3-triethoxysilylpropyl-perfluorooctanoic amide [$CF_3(CF_2)_7CH_2CH_2Si(OCH_3)_3$], a silane coupling agent. The shape of the magnetic fluid 10 dropped centrally on the upper surface of the stainless steel plate 25 did not change as shown in FIG. 8 even after an elapsed time of 5 minutes. "Excellent" oil-repelling property was confirmed.

EXPERIMENT 3

An experiment was conducted under the above-described conditions by using β-perfluoromethylethyltrimethoxysilane [$CF_3CH_2CH_2Si(OCH_3)_3$], a silane coupling agent. The shape of the magnetic fluid 10 dropped centrally on the upper surface of the stainless steel plate 25 changed but did not reach the lower edge of the stainless steel plate 25 as shown in FIG. 9 after an elapsed time of 5 minutes. "Good" oil-repelling property was confirmed.

A description will next be made of one example of treatment process suitable for forming oil-repelling layers on surfaces of members with a silane coupling agent chosen through such an experiment as described above, said members being actually employed to construct a magnetic fluid sealing device, and also of an experiment conducted to confirm the performance of a magnetic fluid sealing device in which pole pieces and shaft with an oil-repelling layer formed thereon by the above process were assembled.

As a pretreatment for the formation of the oil-repelling layers on the surfaces of the stainless-made pole pieces and shaft, respectively, the pole pieces and shaft were dipped in trichlorotrifluoroethane (trade mark: Freon; besides, other organic solvents such as trichloroethane are also usable) and ultrasonic vibrations were applied to degrease the surfaces of the pole pieces and shaft. After completion of the pretreatment, an oil-repelling layer was formed on the surface of each of the pole pieces and shaft through the following three steps.

(a) First step

The surface-degreased pole pieces and shaft were dipped for 15–30 minutes in a 0.05–5 wt./v.% solution of the silane coupling agent in Freon as a solvent while controlling the temperature of the solution at 40° C., whereby the solution was allowed to reach everywhere on the surfaces of the pole pieces and shaft.

(b) Second step

Immediately after the pole pieces and shaft were taken out of the solution, they were dipped for 5 seconds to 1 minute in an ultrasonically-vibrated tank filled with fresh Freon. After any extra silane coupling agent deposited on the pole pieces and shaft was removed, the pole pieces and shaft were taken out.

(c) Third step

The pole pieces and shaft taken out of Freon were dried under evacuation over 8 hours while heating them at 100° C.

The pole pieces and shaft having oil-repelling layers formed on the entire surfaces thereof, respectively, were assembled as shown in FIG. 1, whereby a magnetic fluid sealing device was constructed. The degree (length) of any displacement of the magnetic fluid 10, which was placed between the outer circumferential wall of the shaft 2 and the inner circumferential edge of each of the pole pieces 8,9, from the inner circumferential edge of each of the pole pieces 8,9 toward its outer circumferential edge was measured.

The shaft 2 and housing 1 used in the experiment had an outer diameter of 7 mm and an inner diameter of 19 mm. The dimension of the gap between the outer circumferential wall of the shaft 2 and the inner circumferential edge of each of the pole pieces 8,9 was 0.2 mm. The amount of the magnetic fluid retained in the gap was 15 µl. The experiment was continuously conducted for 200 hours under the conditions of 60° C. and 90% relative humidity while rotating the shaft 2 at the speed of 3,600 r.p.m. After an elapsed time of 200 hours, the displacement of the magnetic fluid 10 toward the outer circumferential edge was measured.

The displacement of the magnetic fluid 10 becomes shorter as the performance of the oil-repelling layers formed on the surfaces of the pole pieces 8,9 becomes better, in other words, their oil-repelling property becomes better. Displacements not longer than 0.5 mm are considered "excellent", displacements from 0.5 mm (not inclusive) to 1.5 mm (inclusive) "good", and displacements greater than 1.5 mm "poor". As a result of the experiment, "excellent" oil-repelling property was obtained from the use of β-perfluorooctylethyltrimethoxysilane or 3-triethoxysilylpropylperfluorooctanoic amide as a silane coupling agent while "good" oil-repelling property was obtained from the use of β-perfluoromethylethyltrimethoxysilane.

In each magnetic fluid sealing device according to the present invention, the surface area on which an oil-repelling layer is formed is, as described above, an intermediate surface area between a surface area—on which the magnetic fluid 10 retained between an edge of the pole piece 8 and a surface of a member, said edge facing said surface, is retained—and another surface area facing a clean space in which a hard disk or the like is accommodated. When oil-repelling layers are formed on an actual magnetic fluid sealing device, they can be formed, for example, as oil-repelling layers 31,31 at the surface areas indicated by dashed lines in FIGS. 11–17.

Figure 11:
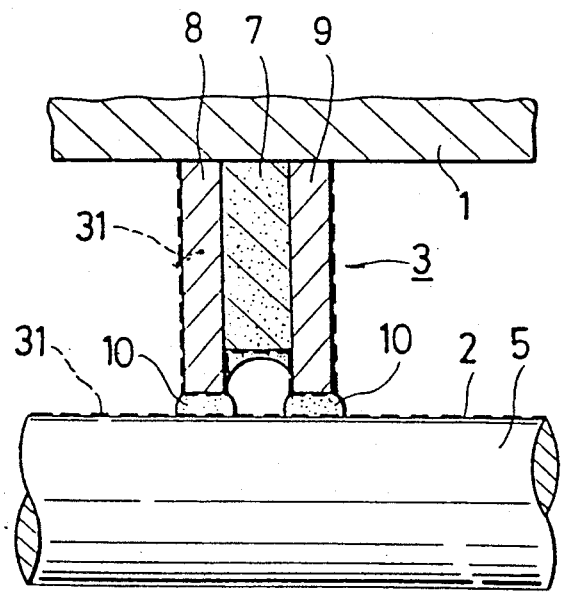
FIGS. 11, 12, 13, 14, 15, 16 and 17 are cross-sectional views showing seven examples of a surface area on which an oil-repelling layer is formed.
Figure 12:
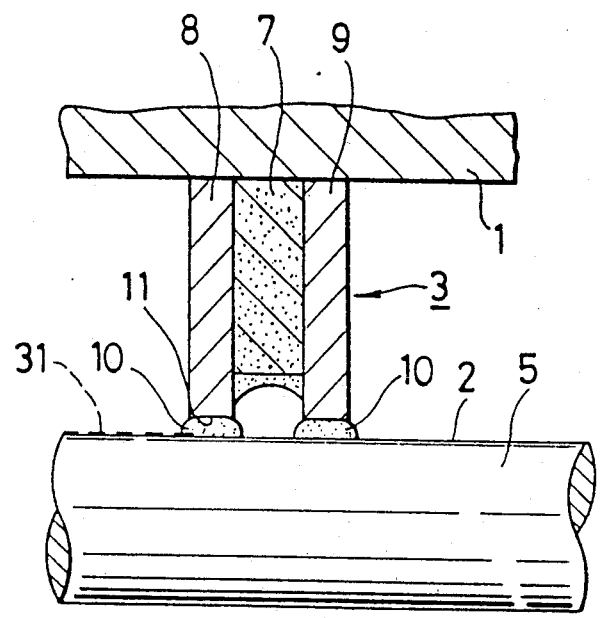

Of these figures, FIG. 11 shows oil-repelling layers 31,31 formed on the entire outer circumferential wall 5 of the shaft 2, the whole outer side walls and inner circumferential edges of the pole pieces 8,9, the whole inner circumferential edge of the permanent magnet 7 and parts of the inner side walls of the pole pieces 8,9, said parts being other than those kept in contact with the corresponding side walls of the permanent magnet 7. FIG. 12 illustrates an oil repelling layer 31 formed on the outer circumferential wall 5 of the shaft 2 at a position inwardly of a clean space than the gap 11 in which the magnetic fluid 10 is retained.

Figure 13:
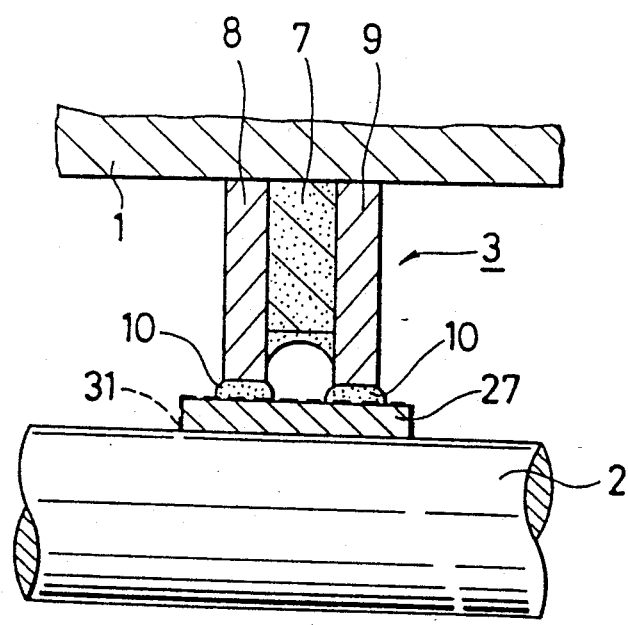
Figure 14:
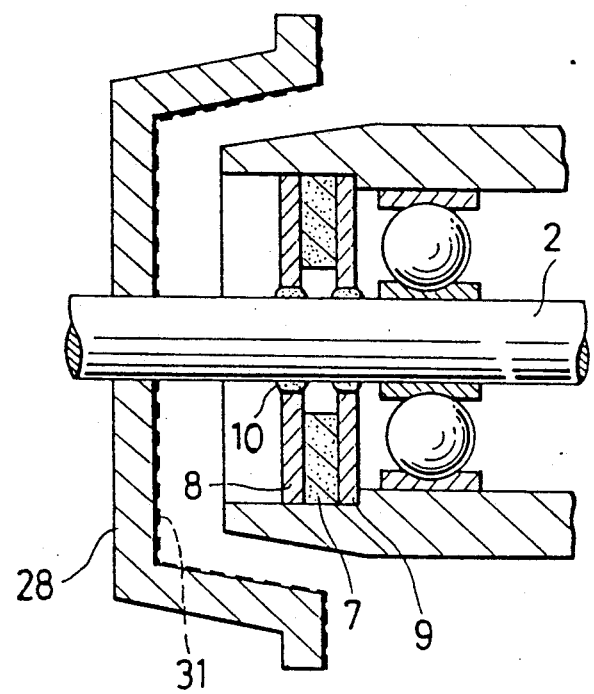
Figure 15:
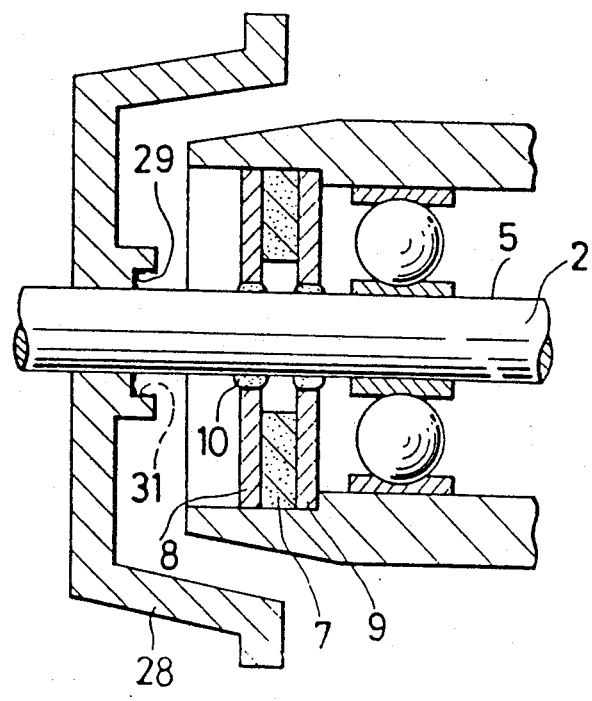

FIG. 13 illustrates an oil-repelling layer 31 formed on surfaces of a cylindrical body 27 made of a magnetic material and fitted and secured on an intermediate surface area of the shaft 2, said intermediate surface area facing the inner circumferential edges of the paired pole pieces 8,9. FIG. 14 depicts an oil-repelling layer 31 formed on a side wall of a mounting flange 28 for a hard disk, which mounting flange 28 is fitted and secured on an end portion of the shaft 2. FIG. 15 illustrates an oil-repelling layer 31 formed on an inner wall of a recessed portion 29 formed between the outer circumferential wall 5 of the shaft 2 and a basal end portion of the mounting flange 28.

Figure 16:
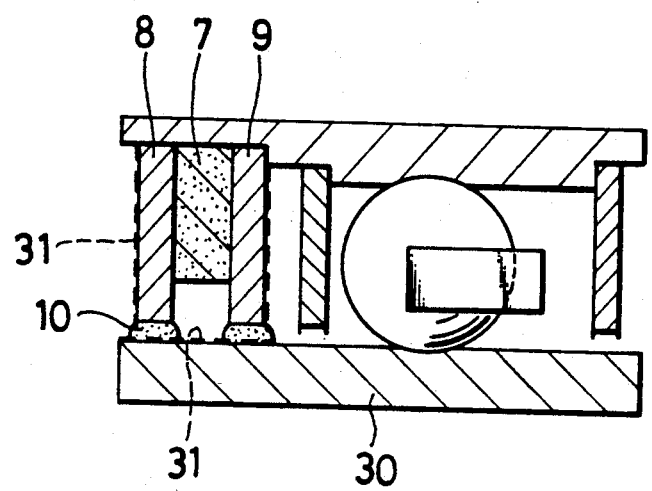
Figure 17:
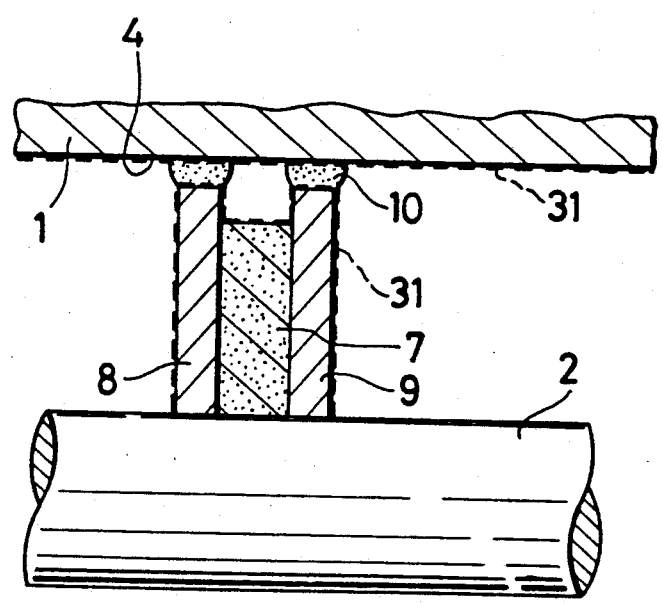

Further, FIG. 16 depicts oil-repelling layers 31 formed on the outer side walls of the pole pieces 8,9, which are assembled in a roller bearing and form a magnetic fluid sealing device, and an outer circumferential wall of an inner race 30 of the roller bearing. In addition, FIG. 17 shows oil-repelling layers 31,31 formed on the whole inner circumferential wall 4 of the housing 1, the whole outer side wall and outer circumferential edges of the pole pieces 8,9, the outer circumferential edge of the permanent magnet 7 and parts of the inner side walls of the pole pieces 8,9, said parts being other than those kept in contact with the corresponding side walls of the permanent magnet 7.

I claim:

1. In a magnetic fluid sealing device for sealing a gap between a first member and a second member movable relative to each other, said device comprising a magnetic fluid and a magnetic means for retaining the magnetic fluid in the gap, the improvement comprising:
   a two-dimensionally bonded monomolecular layer formed as an oil-repelling layer from a coupling agent on at least an intermediate surface area of at least one of the first and second members, said intermediate surface area being located between a fluid-deposited surface area of said at least one member and a fluid-free surface area free of said at least one member.

2. The device of claim 1, wherein the coupling agent is a silane coupling agent.

3. The device of claim 2, wherein the silane coupling agent is represented by the following structural formula:

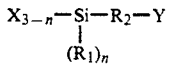

wherein X means a hydrolyzable group, Y denotes a perfluoroalkyl or fluoroalkyl chain, $R_1$ represents an ethyl or methyl group, $R_2$ is a methylene group represented by $-(CH_2)_m-$, m being a natural number, and n stands for an integer of 0, 1 or 2.

4. The device of claim 3, wherein the perfluoroalkyl or fluoroalkyl chain contains a polar structure.

5. The device of claim 4, wherein the polar structure is an amido or sulfonamido group.

6. In a magnetic fluid sealing device comprising:
a shaft made of a magnetic material and having a cylindrical outer circumferential wall,
a housing rotatable relative to the shaft,
a permanent magnet formed in an annular shape of a size that permits the permanent magnet to be freely inserted into a cylindrical space between an inner circumferential wall of the housing and the outer circumferential wall of the shaft, said permanent magnet having been magnetized in an axial direction thereof,
at least one pole piece formed in an annular shape having an inner diameter greater than the outer diameter of the shaft, said pole piece being secured on a side wall of the permanent magnet and fitted in place within the inner circumferential wall of the housing,
a magnetic fluid retained between the inner circumferential edge of the pole piece and the outer circumferential wall of the shaft by the magnetic force of the permanent magnet,
a first fluid-deposited surface area which is a part of the outer circumferential wall of the shaft with the magnetic fluid deposited thereon,
a first fluid-free surface area which is another part of the outer circumferential wall of the shaft, said another part being located in a clean space defined inwardly of the housing than the first fluid-deposited surface area,
a second fluid-deposited surface area which is the surface of the inner circumferential edge of the pole piece, and
a second fluid-free surface area which is a part of a side wall of the pole piece, said side wall facing the clean space, the improvement comprising:
a two-dimensionally bonded monomolecular layer formed as an oil-repelling layer from a coupling agent on at least one of a first intermediate surface area on the outer circumferential wall of the shaft and a second intermediate surface area on the side wall of the pole piece, said first intermediate surface area being located between the first fluid-deposited surface area and the first fluid-free surface area, and said second intermediate surface area between the second fluid-deposited surface area and the second fluid-free surface area.

7. The device of claim 6, additionally comprising a further member secured on the outer circumferential wall of the shaft, said first fluid-free surface area and said first intermediate surface area being both located on a surface of the further member.

8. The device of claim 6, wherein the coupling agent is a silane coupling agent.

9. The device of claim 8, wherein the silane coupling agent is represented by the following structural formula:

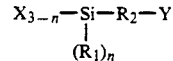

wherein X means a hydrolyzable group, Y denotes a perfluoroalkyl or fluoroalkyl chain, $R_1$ represents an ethyl or methyl group, $R_2$ is a methylene group represented by $-(CH_2)_m-$, m being a natural number, and n stands for an integer of 0, 1 or 2.

10. In a magnetic fluid sealing device comprising:
at least one pole piece having a circular outer circumferential edge,
a housing having a cylindrical inner circumferential wall greater in diameter than the outer circumferential edge of the pole piece, said housing being made of a magnetic material and being rotatable relative to the pole piece,
a permanent magnet shaped and sized to permit the permanent magnet to be freely inserted into the housing, said permanent magnet having been magnetized in an axial direction thereof and being secured on a side wall of the pole piece,
a magnetic fluid retained between the outer circumferential edge of the pole piece and the inner circumferential wall of the housing by the magnetic force of the permanent magnet,
a first fluid-deposited surface area which is a part of the inner circumferential wall of the housing with the magnetic fluid deposited thereon,
a first fluid-free surface area which is another part of the inner circumferential wall of the housing, said another part being located in a clean space defined inwardly of the housing than the first fluid-deposited surface area,
a second fluid-deposited surface area which is the surface of the outer circumferential edge of the pole piece, and
a second fluid-free surface area which is a part of a side wall of the pole piece, said side wall facing the clean space, the improvement comprising:
a two-dimensionally bonded monomolecular layer formed as an oil-repelling layer from a coupling agent on at least one of a first intermediate surface area on the inner circumferential wall of the housing and a second intermediate surface area on the side wall of the pole piece, said first intermediate surface area being located between the first fluid-deposited surface area and the first fluid-free surface area, and said second intermediate surface area between the second fluid-deposited surface area and the second fluid-free surface area.

11. The device of claim 10, additionally comprising a further member secured on the inner circumferential wall of the housing, said first fluid-free surface area and said first intermediate surface area being both located on a surface of the further member.

12. The device of claim 10, wherein the coupling agent is a silane coupling agent.

13. The device of claim 12, wherein the silane coupling agent is represented by the following structural formula:

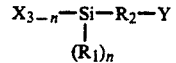

wherein X means a hydrolyzable group, Y denotes a perfluoroalkyl or fluoroalkyl chain, $R_1$ represents an ethyl or methyl group, $R_2$ is a methylene group represented by $-(CH_2)_m-$, m being a natural number, and n stands for an integer of 0, 1 or 2.

* * * * *